United States Patent
Cogliano

[19]

[11] Patent Number: 6,074,212
[45] Date of Patent: Jun. 13, 2000

[54] SEQUENCE LEARNING TOY

[76] Inventor: Mary Ann Cogliano, 5565 St. Francis Cir., Loomis, Calif. 95650

[21] Appl. No.: 09/247,622

[22] Filed: Feb. 10, 1999

Related U.S. Application Data

[60] Provisional application No. 60/075,115, Feb. 11, 1998.

[51] Int. Cl.$^7$ ................................................. G09B 1/00
[52] U.S. Cl. ........................ 434/159; 434/160; 434/327; 434/335; 446/297; 446/369
[58] Field of Search .................................. 434/159, 169, 434/327, 337, 365; 446/297, 313, 368, 369, 143

[56] References Cited

U.S. PATENT DOCUMENTS

| | | |
|---|---|---|
| 3,768,179 | 10/1973 | Woodford et al. . |
| 4,114,292 | 9/1978 | Smith ........................................ 434/335 |
| 4,280,809 | 7/1981 | Greenberg et al. ........................ 434/343 |
| 4,358,278 | 11/1982 | Goldfarb .................................... 434/337 |
| 4,509,920 | 4/1985 | Kaufman . |
| 4,521,205 | 6/1985 | Spector . |
| 4,609,356 | 9/1986 | Gilden et al. ............................. 434/259 |
| 4,651,613 | 3/1987 | Harrison . |
| 4,681,548 | 7/1987 | Lemelson ................................. 434/311 |
| 4,846,692 | 7/1989 | Delcambre . |
| 4,936,780 | 6/1990 | Cogliano . |
| 4,968,255 | 11/1990 | Lee et al. . |
| 5,092,777 | 3/1992 | Crowe . |
| 5,413,355 | 5/1995 | Gonzalez . |
| 5,478,240 | 12/1995 | Cogliano .................................. 434/327 |
| 5,511,980 | 4/1996 | Wood ........................................ 434/169 |

OTHER PUBLICATIONS

Alphabet Block Train. Popular Science Magazine, p. 151, vol. 149, Nov. 1946.

"ALPHABET BLOCK TRAIN" by Popular Science Magazine—Nov. 1946 (one page).

*Primary Examiner*—Kien T. Nguyen
*Assistant Examiner*—Bena B. Miller
*Attorney, Agent, or Firm*—Hoffman, Wasson & Gitler

[57] ABSTRACT

An educational toy for teaching a child a sequence of letters, numbers, colors or other sequences. The toy would be provided with a plurality of segmented body portions, each of the body portions associated with a single indicia. A switch is provided on each of the segmented body portions. When this switch is depressed, an audio output associated with the indicia would be produced. After the child has memorized a series of indicia to produce a learned sequence, a switch associated with a segmented body portion having demarcation indicia would be depressed, allowing the entire sequence to be vocalized in order.

14 Claims, 3 Drawing Sheets

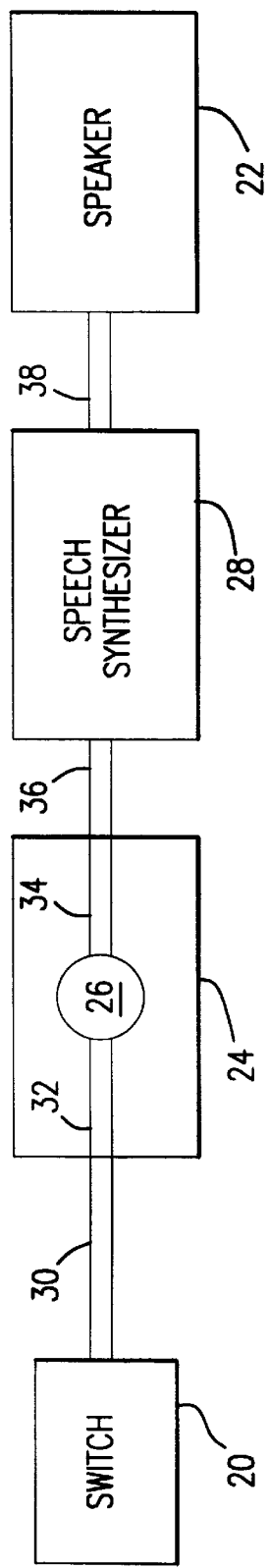
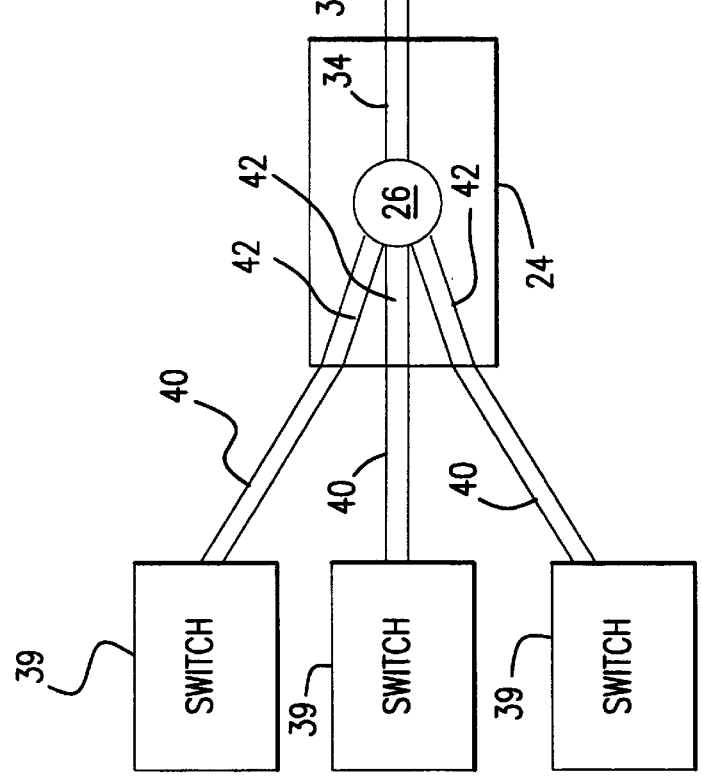
FIG.2
FIG.3

SEQUENCE LEARNING TOY

This application claims benefit of Provisional Appl. Ser. No. 60/075,115, filed Feb. 11, 1998.

BACKGROUND OF THE INVENTION

From time immemorial, the education of the children in a particular society has been paramount in the minds of the parents and the elders of the society. Do to the increasing complexity of our society, educators have long spent their time devising various methods and devices for better educating our children at an earlier and earlier age. This increasing complexity in our day and age is due in part to the development of new technologies, such as printed circuit boards, microprocessors and voice synthesizers used in almost every facet of our daily lives. Since virtually every educator believes that reading is the most important skill to be developed by a child, these educators have endeavored to utilize modern day technology to interest the child in reading as well as to develop the appropriate stills at a relatively early age.

One of the first toys utilized by pre-school children to enhance visual as well as manipulative skills is a set of blocks. These blocks have been embossed with various indicia used to interest and stimulate the child. Many of these blocks include a set of alphabet letters which children can use to familiarize themselves with the shape and formation of each letter. Alternatively, these blocks could be used to formulate rudimentary words. While these types of blocks have been utilized to stimulate the children's visual skills, these blocks would provide no benefit relating to the audio skills needed to develop a child's reading ability. While the child can recognize various letters utilized in these types of blocks, he or she would have no clue as to the sound of the individual letters of the alphabet based solely upon utilizing this set of blocks.

U.S. Pat. No. 4,936,780, issued to Cogliano, addresses this problem by providing the child with one or more series of blocks having indicia on at least one side. A capacitive or pressure switch is used to active a voice synthesizer provided in the interior of the block. The synthesizer would be connected to a speaker to produce a sound corresponding to the indicia provided on the surface of the block. While it has been established that this block would aid in the ability of a child to associate the shape of one of the letters with its sound, this patent could not be utilized to assist the child in learning where in the alphabet a particular letter is to be placed.

U.S. Pat. No. 4,651,613, issued to Harrison, describes a musical block including a cube having six faces and an actuator associated with each of the faces. Based upon an applique provided on each of the faces, the sound or musical tune would be played once the associated actuator is engaged.

However, as was true with respect to the Cogliano patent, this musical block would not allow a child to learn a proper alphanumeric sequence. The problem of teaching a child a proper alphanumeric or color sequence has been addressed by U.S. Pat. Nos. 4,846,692, issued to Delcambre; 4,509, 920, issued to Kaufmann; as well as an article appearing on page 151 of volume 149 of *Popular Science* magazine.

The patent to Kaufmann describes an educational toy for teaching alphanumeric sequences and is provided with a plurality of body members and an irregular, generally cylindrical configuration. Each of these body members 15–20 includes a device for cooperating with a guide means in a manner in which each of the body members rotates about an axis 13 of a support member in a first direction. These body parts are provided with buttons 33–37 saving various indicia thereon. For example, each button could be assigned a separate number "1", "2", "3", "4" and "5" or particular letters, such as "A", "B", "C", "D" and "E". Therefore, if the child would properly construct the educational toy, the numbers or the letters would be in the proper sequence.

The patent to Delcambre is also directed to an educational children's toy for teaching proper numeric, alphabetic or color sequences. A toy stand is provided with a plurality of vertical shafts 15. Each of the vertical shafts has a number, color or letter associated therewith. A plurality of blocks is associated with the children's toy. If these blocks are not put into the vertical shafts 15 in the proper sequence, they will fall to the bottom of the toy. In this manner, a proper alphanumeric sequence can be learned.

The *Popular Science* article contains a number of blocks, each having indicia associated therewith. With the exception of the first block in any sequence, each of the blocks is provided with both a joint member as well as a receiving device. Each of the joints would fit into only one of the receiving devices. Therefore, once the blocks are properly attached to one another, an alphanumeric sequence can be learned.

Although the prior art does show various devices designed to teach a child different types of sequences, the prior art does not combine the teaching of a sequence with the sound associated to each element in the sequence.

SUMMARY OF THE INVENTION

The present invention is directed to an innovative educational toy designed to appeal to pre-school age children. A plush, stuffed, elongated insect in the character of a caterpillar, at centipede or any other long, contoured, segmented insect could be utilized. Additionally, the toy could take the form of any appropriate animal. Each segment of the animal body, or insect's body, is provided with indicia which would be related to other indicium provided on other portions of the body. A microprocessor as well as a voice synthesizer would be provided within the animal body or the insect's body. The voice synthesizer would produce various audible outputs responsive to the depression of various input switches provided or associated with each segment of the animal's or insect's body. Additionally, the insect's head or the animal's head and mouth would be designed to mechanically open and sing, or otherwise verbalize the audio response.

BRIEF DESCRIPTION OF THE DRAWINGS

In order that the invention may be readily carried into effect, it sill now be described with reference to the accompanying drawings, wherein:

FIG. 2 is a circuit diagram used to produce a single sound; and

FIG. 3 is a second circuit diagram used to produce a number of sounds; and

DETAILED DESCRIPTION OF THE DRAWINGS

Figure 1:
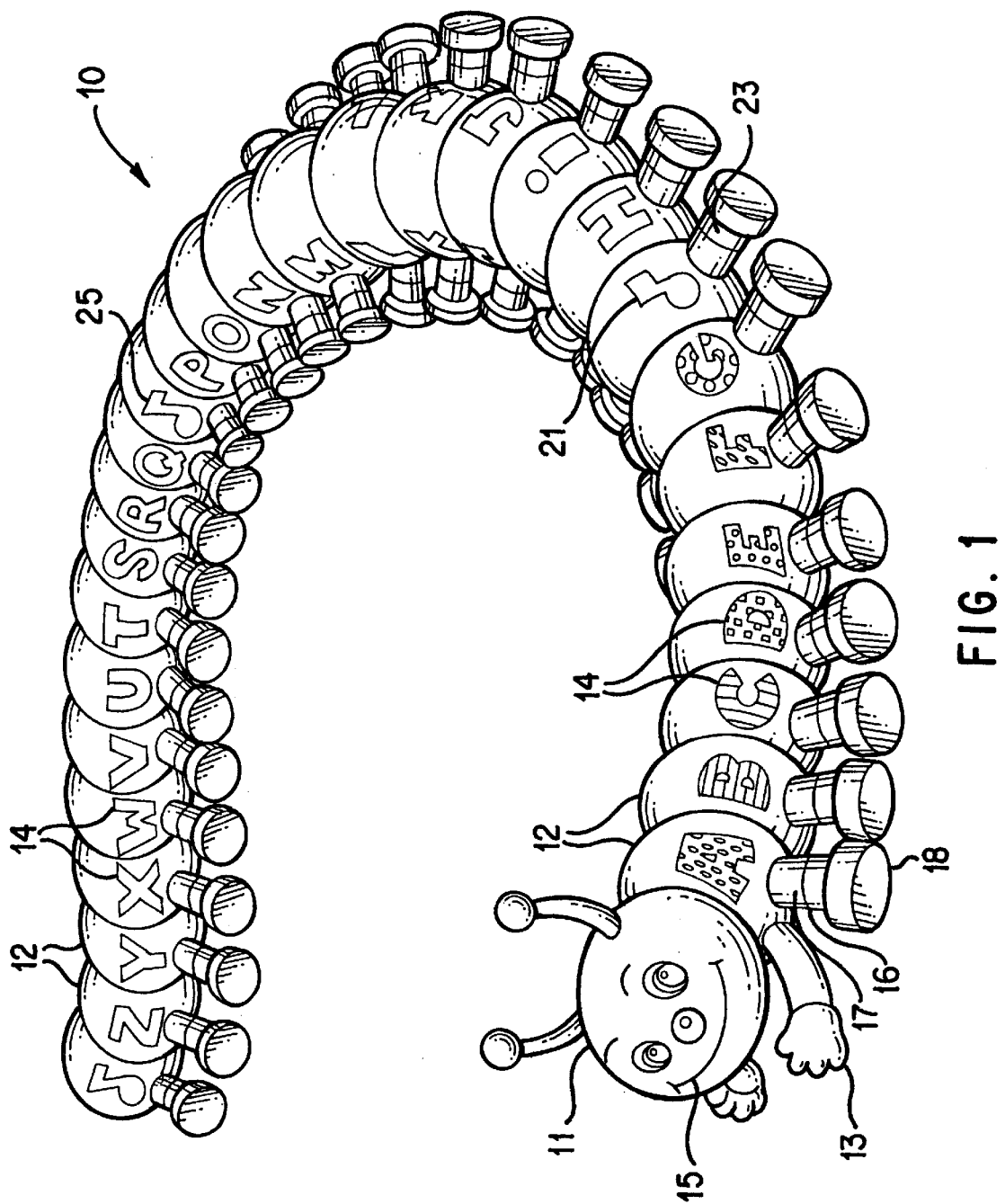
FIG. 1 is a perspective view of one embodiment of the present invention.
Figure 4:
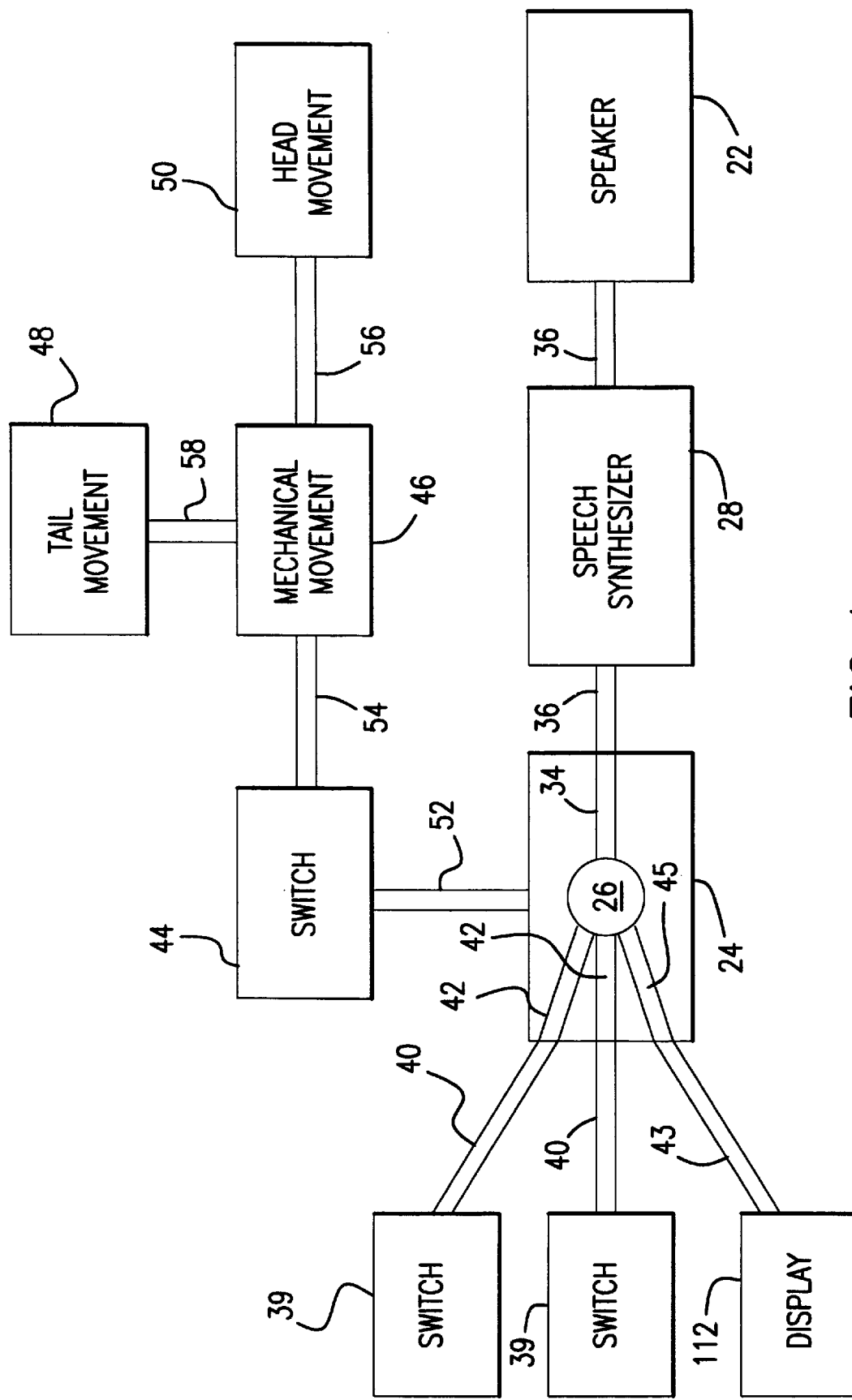
FIG. 4 is a third circuit diagram used to produce a sound and a movement of the toy.

As Illustrated with respect to FIG. 1, the sequence learning toy 10 is in the form of a caterpillar having a plurality of segmented body portions 12. Each of these segmented body portions can be hemispherical or concave in shape or in any other manner pleasing to the child. Although the type of animal or insect car be virtually limitless, we will describe the present invention with respect to a caterpillar. Each of the segmented body portions would be constructed from a plush material, soft to the touch, and the interior of each of these segmented body portions would be equally plush. Additionally, the interior portion of each of the segmented body portions 12 can be filled with various pleasing aromas or textures, such as flax, lavender, chamomille and the like.

The outer body portion of the toy would include a plurality of switches 17. As illustrated in FIG. 1, each of the segmented body portions 12 is provided with a pair of pressure, capacitive or similar switches which are capable of being depressed by the child. Since FIG. 1 is illustrated as a caterpillar, the two switches 17 associated with each of the segmented body portions 12 would serve as the legs of the caterpillar. Each switch 17 is connected to the side of its respective body portion and would be pointed downward therefrom. Alternatively, each of the switches 17 can be connected to the bottom of each of the segmented body portions 12 and extend either in a horizontal or a vertical manner. As illustrated with respect to FIG. 1, each of the switches 17 is provided with a portion 16 directly affixed to the segmented body portion 12, as well as a portion 18 which is connected to one end of the portion 16. Section 18 would either be depressed by the child or would be activated when the child touches this portion 18.

Each of the outer surfaces of the segmented body portions 12 would include at least one indicia 14 associated with each of the body portions. If the purpose of the toy is to teach the child the sequence of letters, each segmented portion would include one of the letters of the alphabet or a demarcation indicia 21 subdividing the letters into various groups. Each of the letters 14 could be applied to the surface of the indicia in any feasible manner. Additionally, each of the indicia could be slightly raised from the plush body of the caterpillar. As illustrated in FIG. 1, the segmented body is divided into four groupings, each grouping separated by demarcation indicia 21, such as a musical note or symbol. The caterpillar is also provided with a head 11 having a mouth 15. The alphabet would begin adjacent to the head 11 of the caterpillar and would proceed in the correct order until it reaches the tail portion of the caterpillar. The switches associated with each of the indicia would be operated either as a touch sensor or by physically depressing the switch. The interior of the caterpillar would include a microprocessor and a voice synthesizer and will be illustrated in great detail later. Therefore, when the child depresses one of the switches 17 associated with a particular indicia, such as the letter "A", the microprocessor, in conjunction with the voice synthesizer would produce the correct audio output. This audio output can be synchronized with the movement of the mechanical head 11 of the caterpillar and/or of the caterpillar's mouth. Additionally, each of the letters could be provided with an illumination device, such as a light-emitting diode (LED) which would be illuminated when the particular letter is depressed.

As previously indicated, the alphabet as shown in FIG. 1 is divided into four categories. Obviously, the number of categories can be changed based upon a particular learning sequence. Furthermore, each of the categories can exhibit a different outer color which could be illuminated using different LED's. At the end of each category, the demarcation indicia 21, such as a musical note, is displayed. Once a child learns the first group of letters, the child could proceed to depress the switch 23 associated with the indicia 21 and the caterpillar's mouth will mechanically open and sing the entire first group of the alphabet (ABCDEFG) that the child has just memorized.

The child will next proceed to memorize the second group of letters (HIJKLMNOP), and when the second musical note 25 is depressed, the caterpillar will sing the entire sequence, beginning with the letter A and ending at the letter P. The child will resume this procedure until the entire alphabet is learned.

It can be envisioned that the indicia can take many forms, such as numbers, shapes or various colors.

FIGS. 2 and 3 illustrate various circuit diagrams which can be utilized in the operation of the present invention. The circuit of FIG. 2 includes a switch 20, a printed circuit board or similar device 24 containing a solid-state, non-erasable memory 26, such as a read-only memory (ROM), a voice synthesizer 28 and a speaker 22. Based upon this circuit, when the switch 20 is activated, a signal is transmitted along conductor 30 to the memory 26 of the printed circuit board 24 along a conductive tracing 32, or similar manner. This signal would be processed and a second signal would be transmitted along tracing 34 to conductor 36 which would thereby produce a digital sound in the voice synthesizer 28. This synthesizer is connected via a conductor 38 to the speaker 22 which would produce a sound representative of the indicia embodied on the surface of the segmented body portion. In this manner, when the switch 20 is depressed, the child can associate an audio output with a visual indicia. The printed circuit as well as the voice synthesizer could be included on a single circuit board which is provided in the interior of the caterpillar's body.

As illustrated with respect to FIG. 3, a plurality of separate touch-reactive or depression-type switches 39 can be utilized in this invention. In this situation, a plurality of conductive wires 40 is connected to the printed circuit board 24. These wires would in turn be connected to separate conductive tracings 42 provided on the printed circuit board, each tracing connected to the memory 26. Consequently, once one of the switches is activated, the special sound coinciding with the indicia provided on the exterior surface of the segmented body to which the switch is attached would be produced.

Once a sequence or a subsequence has been properly spelled or completed, a switch 44 connected to the printed circuit 24 by a conductor 52 would enable various parts of the animal or insect to move utilizing a mechanical movement device 46 which would be enabled by the switch 44 through a conductor 54. This mechanical movement device 46 is connected, in the example of a caterpillar, to move the head through a head movement device 50 which could also include movement of the caterpillar's mouth. Furthermore, the tail of the insect or animal could also be moved using a tail movement device 48. The general mechanical movement device 46 is connected to the head movement device 50 by a conductor 46 and to the tail movement device 48 by a conductor 58. A display 112 is connected to the printed circuit: board via a conductor 43. This display would indicate that the LED associated with each of the segmented body parts would be illuminated at the same time that the corresponding audio response would generated based upon the depression of the corresponding switch.

While one embodiment of the invention has been described in detail, it will be apparent to those skilled in the art that the enclosed embodiment may be modified. Therefore, the foregoing description is to be considered exemplative rather than limiting. As indicated hereinabove, the type or animal or insect utilized may take various forms.

What is claimed is:

1. An educational toy, comprising:
   a simulated animal figure provided with an elongated body provided with a plurality of segmented body parts extending in a substantially longitudinal direction from a front portion of said figure to an end portion of said figure;
   a plurality of first switching devices connected to said plurality of segmented body parts each of said plurality of first switching devices extending from said segmented body parts in the form of an appendage;
   a series of indicia representative of a historically recognizable sequence, each of said indicium of said series of indicia associated with one of said plurality of first switching devices and further wherein each of said first switching devices is connected to said elongated body in the vicinity of its respective indicium, and further wherein said series of indicia is arranged on the educational toy in said historically recognizable sequence beginning from said front portion of said figure;
   a microprocessor provided with a memory, said microprocessor included within said simulated figure and connected to each of said plurality of first switching device;
   a voice synthesizer provided within said simulated figure and connected to said microprocessor, said voice synthesizer producing a sound associated with each of said indicium when said switch associated with its respective indicium is engaged; and
   a speaker connected to said voice synthesizer.

2. The toy in accordance with claim 1, wherein said simulated figure is a caterpillar.

3. The toy in accordance with claim 1, wherein the outer surface of said simulative figure is constructed from plush material.

4. The toy in accordance with claim 1, wherein said historically recognizable sequence is the alphabet.

5. The toy in accordance with claim 1, further including at least one second switching device connected to one of said segmented body parts, said second switching device connected to said microprocessor, wherein each of said members of said historically recognizable sequence is individually vocalized in said historically recognizable sequence by said voice synthesizer when said second switching device is engaged.

6. The toy in accordance with claim 5, wherein said simulated figure is a caterpillar.

7. The toy in accordance with claim 5, wherein said simulated figure includes a head segment and a movement device connected to said microprocessor, said movement device initiating movement of said head when said second switching device is engaged.

8. The toy in accordance with claim 5, wherein the outer surface of said simulative figure is constructed from plush material.

9. The toy in accordance with claim 5, wherein said historically recognizable sequence is the alphabet.

10. The toy in accordance with claim 5, wherein each of said plurality of segmented body parts is provided with either one of said first switching devices or one of said second switching devices.

11. The toy in accordance with claim 5, wherein said series of indicia is subdivided into at least two subseries of said historically recognizable sequences, each of said subseries separated from one another by said second switching device, and further including a demarcation indicia associated with each of said second switching devices, wherein at least one of said subseries of said historically recognizable sequence is utilized by said voice synthesizer when said second switching device is engaged, to individually vocalize the members of at least one of said subseries of said historically recognizable sequence in said historically recognizable sequence.

12. The toy in accordance with claim 11, wherein said simulated figure includes a head segment and a movement device connected to said microprocessor, said movement device initiating movement of said head when said second switching device is engaged.

13. The toy in accordance with claim 11, wherein said historically recognizable sequence is the alphabet.

14. The toy in accordance with claim 11, wherein each of said plurality of segmented body parts is provided with either one of said first switching devices or one of said second switching devices.

* * * * *